US012679215B2

(12) United States Patent     (10) Patent No.:   US 12,679,215 B2

Bechtel et al.     (45) Date of Patent:    Jul. 14, 2026

---

(54) ELECTRIC VEHICLE WITH INBOARD FRICTION BRAKE ASSEMBLY

(71) Applicant: FCA US LLC, Auburn Hills, MI (US)

(72) Inventors: Travis D Bechtel, Auburn Hills, MI (US); Mark E Stout, II, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/755,773

(22) Filed: Jun. 27, 2024

(65) Prior Publication Data

US 2026/0001408 A1    Jan. 1, 2026

(51) Int. Cl.
| | |
|---|---|
| *B60L 7/26* | (2006.01) |
| *B60K 17/02* | (2006.01) |
| *F16H 48/22* | (2006.01) |

(52) U.S. Cl.
CPC ............... B60L 7/26 (2013.01); B60K 17/02 (2013.01); *B60L 2240/461* (2013.01); *F16H 48/22* (2013.01)

(58) Field of Classification Search
CPC ..... B60L 7/26; B60L 2240/461; B60K 23/04; B60K 2023/046; B60K 17/18; B60K 17/16; F16H 48/00–2048/368
See application file for complete search history.

(56) References Cited

U.S. PATENT DOCUMENTS

| | | | |
|---|---|---|---|
| 2012/0130581 A1* | 5/2012 | Semsey ............... | B60T 8/17555 |
| | | | 701/22 |
| 2017/0282925 A1* | 10/2017 | Geller ................... | B60T 8/3255 |
| 2018/0155053 A1* | 6/2018 | Wang ...................... | B64C 13/34 |
| 2022/0266697 A1* | 8/2022 | Park .......................... | B60L 7/18 |
| 2023/0234590 A1* | 7/2023 | Sanada ............... | B60L 15/2009 |
| | | | 701/22 |

FOREIGN PATENT DOCUMENTS

EP       0361708 A2 *   4/1990   ......... B60L 15/2009

\* cited by examiner

*Primary Examiner* — Tinh T Dang
(74) *Attorney, Agent, or Firm* — Jeremy J. Klobucar

(57) ABSTRACT

An electric vehicle includes an electric traction motor configured to drive the vehicle, first and second half shafts operably coupled to the electric traction motor, and a single inboard friction brake assembly operably coupled to the first half shaft and configured to selectively brake the first half shaft and a first wheel connected thereto. A controller is in signal communication with the electric traction motor and the inboard friction brake assembly to selectively perform a regenerative braking operation with the electric traction motor and a friction braking operation with the inboard friction brake assembly.

19 Claims, 4 Drawing Sheets

ELECTRIC VEHICLE WITH INBOARD FRICTION BRAKE ASSEMBLY

FIELD

The present application relates generally to vehicles and, more particularly, to an electric motor vehicle with a single inboard friction brake assembly.

BACKGROUND

Conventional electric drive module and axle paired friction braking designs are not optimized for cost and weight when considering the drive torque and horsepower output, regenerative braking capability, and friction braking needs for passenger vehicles and light trucks. Typical regenerative braking systems are incapable of performing all the braking duties required by the vehicle. Such systems utilize light braking at moderate speeds by absorbing (regenerating) energy as the vehicles slows, but these systems often utilize friction brakes to completely stop and hold the vehicle in position. Moreover, motor power rating limits the braking proportion that can be performed regeneratively from higher speeds, requiring larger friction brakes than may be desired for general operating conditions. Accordingly, while such systems work well for their intended purpose, there is a desire for improvement in the relevant art.

SUMMARY

In accordance with one example aspect of the invention, an electric vehicle is provided. In one example, the electric vehicle includes an electric traction motor configured to drive the vehicle, first and second half shafts operably coupled to the electric traction motor, and a single inboard friction brake assembly operably coupled to the first half shaft and configured to selectively brake the first half shaft and a first wheel connected thereto. A controller is in signal communication with the electric traction motor and the inboard friction brake assembly to selectively perform a regenerative braking operation with the electric traction motor and a friction braking operation with the inboard friction brake assembly.

In addition to the foregoing, the described vehicle may include one or more of the following features: a regenerative braking system in signal communication with the controller and configured to perform the regenerative braking operation; a gearbox assembly coupled to the electric traction motor; an open differential coupled between the first and second half shafts and operably coupled to the electric traction motor; a limited slip differential coupled between the first and second half shafts and operably coupled to the electric traction motor; and a limited slip clutch coupled between the first and second half shafts and operably coupled to the electric traction motor.

In addition to the foregoing, the described vehicle may include one or more of the following features: a non-differential spool coupled to the electric traction motor, and a decoupling clutch coupled between the first and second half shafts and operably coupled to the electric traction motor; wherein the decoupling clutch is configured to interrupt torque through an intermediate shaft between the spool and the inboard friction brake assembly; wherein the first and second half shafts provide power to vehicle wheels without a differential.

In addition to the foregoing, the described vehicle may include one or more of the following features: wherein the first half shaft is coupled to a first wheel, and the second half shaft is coupled to a second wheel, and further comprising a wheel speed sensor operably coupled to each of the first and second wheels and in signal communication with the controller; and wherein the controller is configured to utilize the regenerative braking operation to slow the electric vehicle during a braking operation, and subsequently blend in use of the inboard friction brake assembly to stop and hold the electric vehicle still.

In addition to the foregoing, the described vehicle may include one or more of the following features: wherein when a hard braking is requested by a driver from a speed that exceeds the electric traction motor's ability to absorb and dissipate the kinetic energy of the electric vehicle via the regenerative braking operation, the controller is programmed to utilize the inboard friction brake assembly to dissipate the kinetic energy until a vehicle speed and rate of deceleration, as determined by the wheel speed sensors, are reduced to a point where the electric traction motor can manage the deceleration rate via the regenerative braking operation; wherein the electric vehicle only includes a single electric traction motor; and wherein the inboard friction brake assembly provides the only friction braking of the electric vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
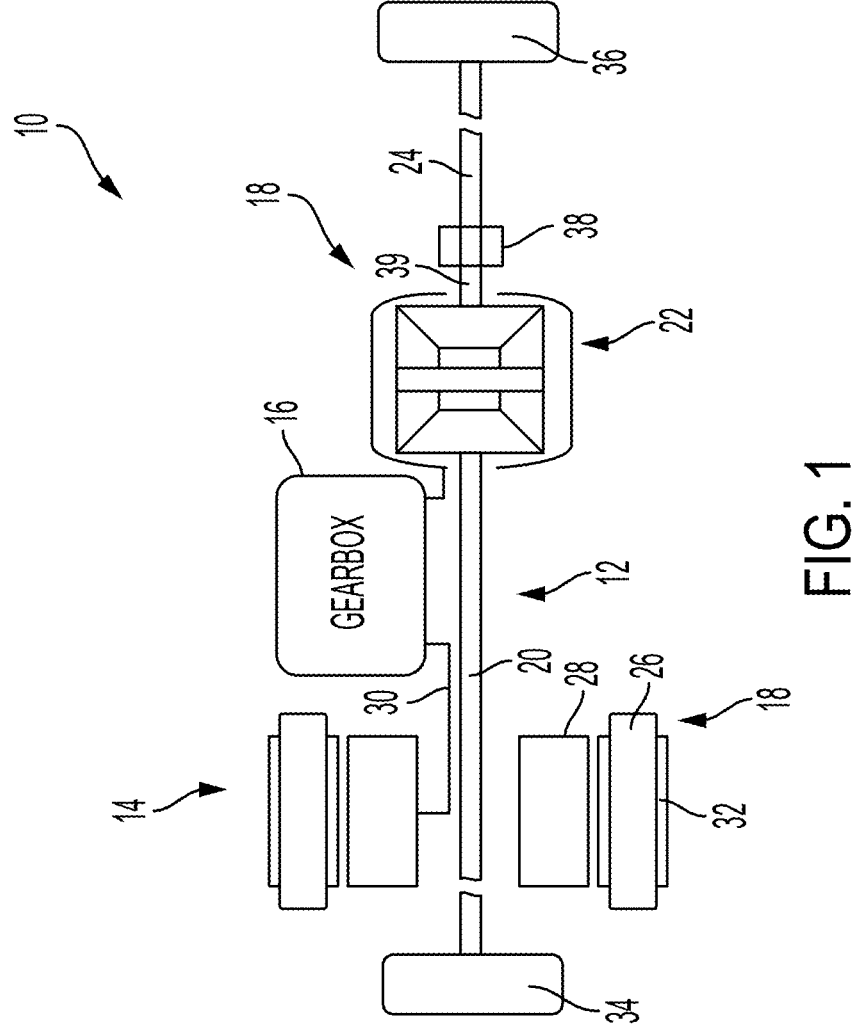
FIG. 1 is a schematic illustration of an example vehicle drivetrain in accordance with the principles of the present application.

According to the principles of the present application, systems and methods are described for an automotive driveline with a single electric motor and a single inboard friction brake assembly. The driveline and chassis advantageously provide reduction to vehicle total mass, un-sprung mass, and rotational inertia in the driveline. The system also enables flexibility in sizing of the power output of an electric drive motor for acceleration and regenerative braking capability.

In the example embodiments, the vehicle driveline system includes a single electric drive motor with speed and direction sensing, an open center differential, a single inboard friction brake assembly, independent left and right output shafts, and independent left and right wheel speed sensors. The system also includes a drive motor electronic control unit for acceleration and braking control, a driver throttle control input, and a driver braking control input. In some embodiments, the system includes an electronically controlled clutch coupling acting between the differential housing (connected to the drive motor) and the side (output) gears, as well as an option brake torque/force reaction sensor.

In general, the vehicle driveline system utilizes an open center differential that maintains a mechanical connection between the drive wheels and the electric motor at all times. Alternative arrangements include a limited slip type clutch that controls differential speed between the outputs of the differential and the differential carrier, or a limited slip or decoupling style clutch acting on one wheel output, without a geared differential.

By providing an electric traction motor with an inboard monobrake (single friction brake), the system provides a multitude of advantages over vehicles with independent outboard brake systems. For example, the system removes the mass of the friction brake system from the un-sprung portions of the vehicle suspension (e.g., inside the wheels) to an inboard location on one side of the electric drive module (EDM) output shaft. This allows more precise tuning of vehicle ride and handling. The system also reduces the total rotational inertial mass of the drive axle, and eliminates the packaging constraints of the brake components in the wheels. This allows the suspension control and steering geometry to be optimized inside the wheel to thereby improve ride and handling characteristics.

Further, the described system allows the tire/wheel diameter to be reduced for packaging, which can translate into further mass reduction and optimization of ride and handling parameters. In some instances, the diameter of an in-wheel braking system restricts how small the diameter of the wheel/tire can be, creating a packaging restriction generated by the tire wheel house or the vehicle load floor height directly related to the tire radius and suspension parameters. The system also provides brake lock differential (BLD) type traction control with only one friction brake assembly, and allows for smaller motor torque/gearing sizing for regenerative braking up to the friction limit of one wheel under heavy braking.

The example driveline system also allows for lower motor power output/sizing and regenerative braking absorption when acceleration performance is not a priority for the vehicle application. The single friction brake can be sized proportionally to the desired mass and top speed of the vehicle, if the regenerative braking power absorption is exceeded at that speed. The single friction brake can also be packaged in a different form factor than the typical package in the road wheel because it does not affect the suspension and spindle geometry. In one example, the friction brake can take the form of a "wet" brake, with multiple plates, having the ability to transfer heat into a hydraulic fluid and capturing brake and metal particulate matter. The system also reduces total part count and cost, and allows for all regenerative or all friction-based braking, or any blend up to the motor's power and torque limits.

In normal use, without friction limited acceleration and braking or high speed operation, the EDM provides acceleration torque as requested by the driver and regenerative braking at a rate selected by the driver. The friction brake is configured to blend in as the vehicle comes to a stop and will hold the vehicle still as desired by the driver. During a high speed stop, hard braking from a speed that exceeds the EDM's ability to absorb the vehicle kinetic energy dissipation, the friction brake is engaged by the controller to dissipate the kinetic energy to heat until the combination vehicle speed and rate of deceleration are reduced to a point that the EDM can manage the deceleration rate. During a panic stop or ABS braking event, the EDM and friction brake torque application are monitored by the system controller as it works to prevent road wheel lock up while providing the maximum rate of deceleration available for the tire and road conditions, as detected by the pedal force applied and the independent wheel sensors.

When the system utilizes an open center differential, the EDM may momentarily allow a controlled reverse resistive torque if the friction brake side is stopped. When the system utilizes a limited slip differential (LSD), the LSD is configured to open to allow the individual wheel braking control as provided by the open center differential. When the system utilizes a limited slip decoupling clutch without a differential, the clutch is configured to open and each wheel is controlled by the EDM or friction brake for its respective wheel side.

The monobrake driveline system is also configured to provide split friction or friction limit acceleration. For the open differential, the system utilizes the friction brake to slow the wheel on its side of the differential, while the EDM modulates the wheel on the other side of the differential output. For the modulated LSD, the system is configured to apply/close the clutch (from an open or partially open position) to bring both wheels to the same speed, thereby providing a locking differential function. For the clutch without a differential, the clutch is configured to close from a partially coupled position and lock the opposed wheels together.

With initial reference to FIG. 1, a portion of a vehicle 10 is shown in accordance with the principles of the present disclosure. In the example embodiment, vehicle 10 includes a propulsion system 12 that generally includes one or more drive units or motors 14 (e.g., electric traction motors) and an electric drive gearbox assembly 16. The electric motor 14 is selectively connectable via a traction inverter to a high voltage battery system (not shown) for powering the electric motor 14, and the gearbox assembly 16 is configured to transfer the generated drive torque to a driveline 18, including a first or left axle shaft 20, a differential 22, and a second or right axle shaft 24. In the example embodiment, the electric motor 14 generally includes a stator 26, a rotor 28, and a rotor output shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34, 36. As shown, vehicle 10 includes only a single drive unit 14 for the pair of axles 20, 24.

In the example embodiment, the driveline 18 includes a single inboard friction brake assembly 38 disposed on the second axle shaft 24. Alternatively, the inboard friction brake assembly 38 may be disposed on the first axle shaft 20. The inboard friction brake assembly 38 is configured to selectively brake the axle shaft 24. In this way, the vehicle 10 does not require individual outboard friction brakes located at each wheel 34, 36. Moreover, placement of the friction brake assembly 38 may define an intermediate shaft 39 between the differential 22 and the friction brake assembly 38.

Figure 2:
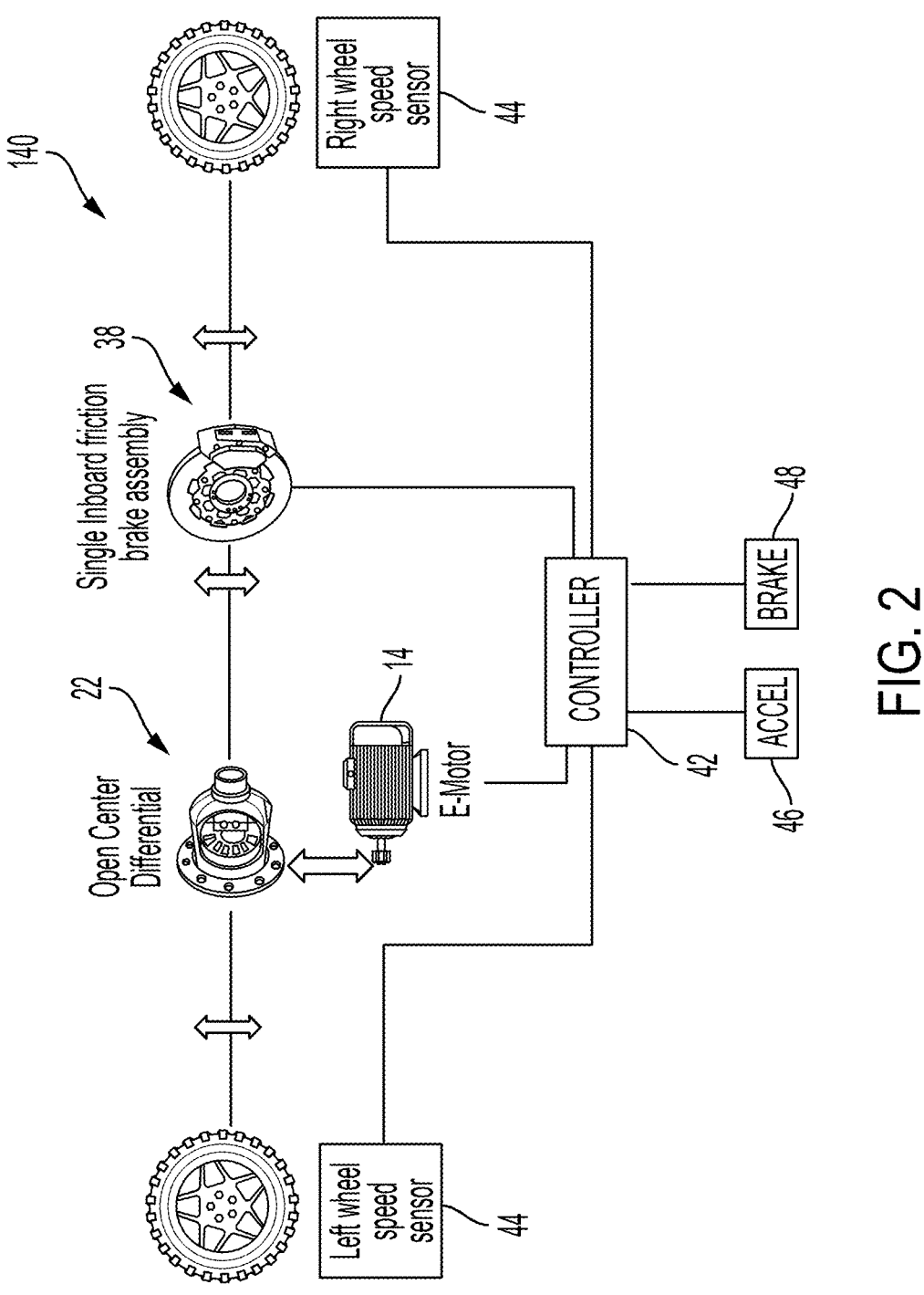
FIG. 2 is a schematic diagram of an example braking system of the vehicle shown in FIG. 1, in accordance with the principles of the present application.

With additional reference to FIG. 2, the vehicle includes a vehicle braking system 40 having a controller 42 in signal communication with the electric motor 14 (including a regenerative braking system) and the inboard friction brake assembly 38, and configured to control one or more braking operations of the vehicle 10. The electric motor 14 is configured to provide one or more signals to the controller 42 indicating a speed and direction of the motor. The controller 42 is also configured to selectively actuate the inboard friction brake assembly 38 to provide a braking force to the driveline 18 or associated axle shaft 24.

In the illustrated example, the controller 42 is also in signal communication with wheel speed sensors 44, a driver throttle control input 46, and a driver braking control input 48. One wheel speed sensor 44 is disposed at each of the left and right wheels 34, 36 and is configured to provide one or more signals indicating a speed of the respective wheel 34, 36. The driver throttle control input 46, such as an accelerator pedal, is configured to provide one or more signals indicating a driver throttle request. The driver brake control input 48, such as a brake pedal, is configured to provide one or more signals indicating a driver brake request.

In normal operation, the electric motor 14 is configured to provide acceleration torque as requested by the driver via the throttle control input 46. To brake the vehicle, the electric motor 14 provides regenerative braking at a user selected rate, and controller 42 operates the inboard friction brake assembly 38 to provide additional braking when required. In one example, controller 42 progressively blends the friction braking with the regenerative as the vehicle comes to a stop, and the inboard friction brake assembly 38 holds the vehicle 10 still as requested by the driver via the brake control input 48.

In a high speed braking operation, where braking from a speed that exceeds the ability of the electric motor 14 to absorb the kinetic energy of the vehicle 10, the controller 42 is configured to engage the inboard friction brake assembly 38. The controller 42 is configured to monitor the wheel speed sensors 44 and, when the vehicle speed and rate of deceleration are reduced to a point that the electric motor 14 can absorb the vehicle kinetic energy, the controller 42 disengages the inboard friction brake assembly 38 and allows the electric motor regenerative braking to manage the deceleration. In yet another operation, the controller 42 is configured to provide split friction or friction limit acceleration by engaging the inboard friction brake assembly 38 to slow the wheel 36 while controlling the electric motor 14 to modulate the opposite wheel 34. In one example, split friction is where one side of the vehicle may be on a low friction surface (e.g., ice) while the other side is on a high friction surface (e.g., pavement). Friction limit acceleration is when the motor output torque exceeds the tire's friction with the ground, causing wheel slip.

Figure 3:
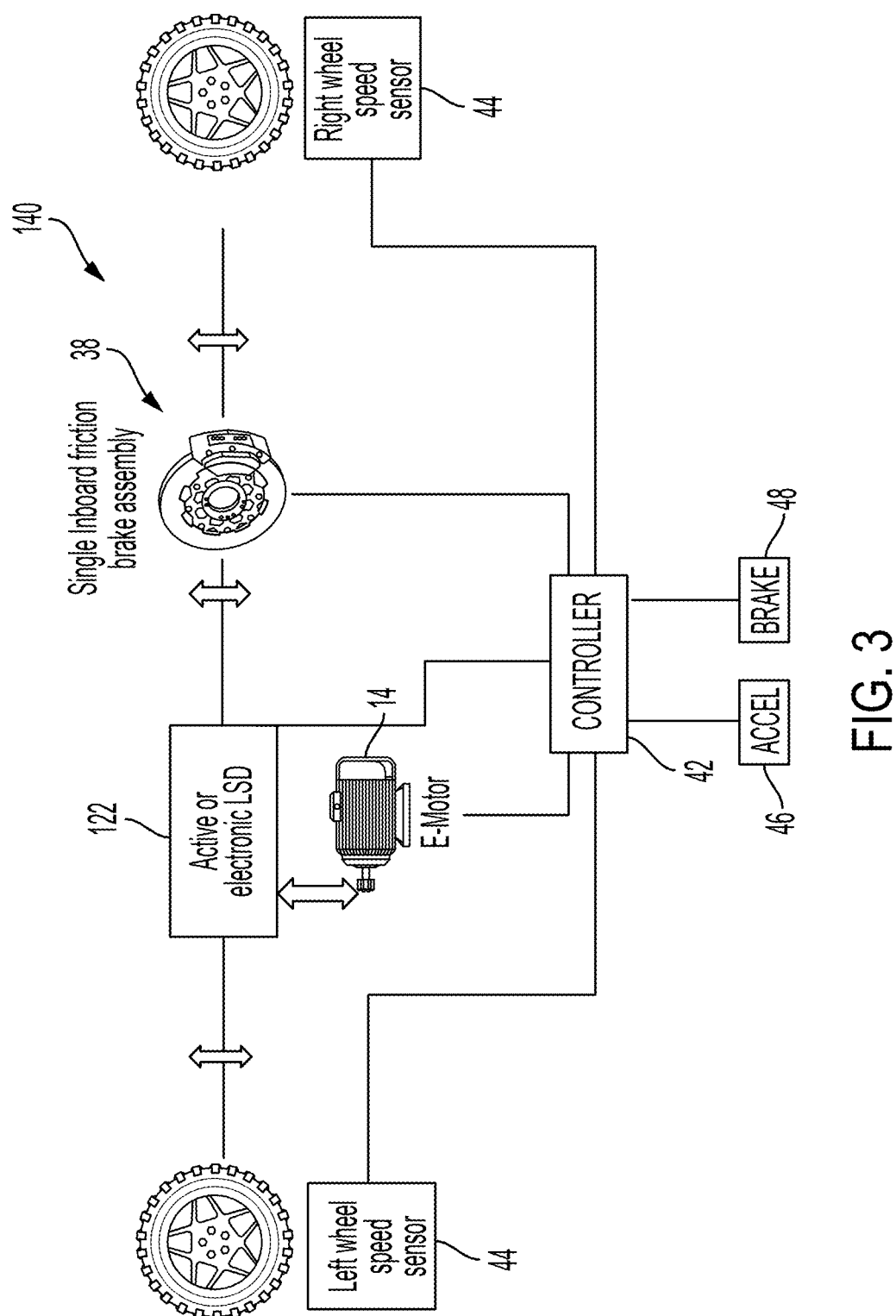
FIG. 3 is a schematic diagram of another example braking system in accordance with the principles of the present application.

With reference now to FIG. 3, an alternative vehicle braking system 140 is illustrated. The vehicle braking system 140 is similar to the vehicle braking system 40, except the open differential 22 is replaced by an active or electronic limited slip differential 122. The vehicle braking system 140 is operated in a similar manner to the braking system 40 by commanding the active limited slip differential 122 to an open state.

Figure 4:
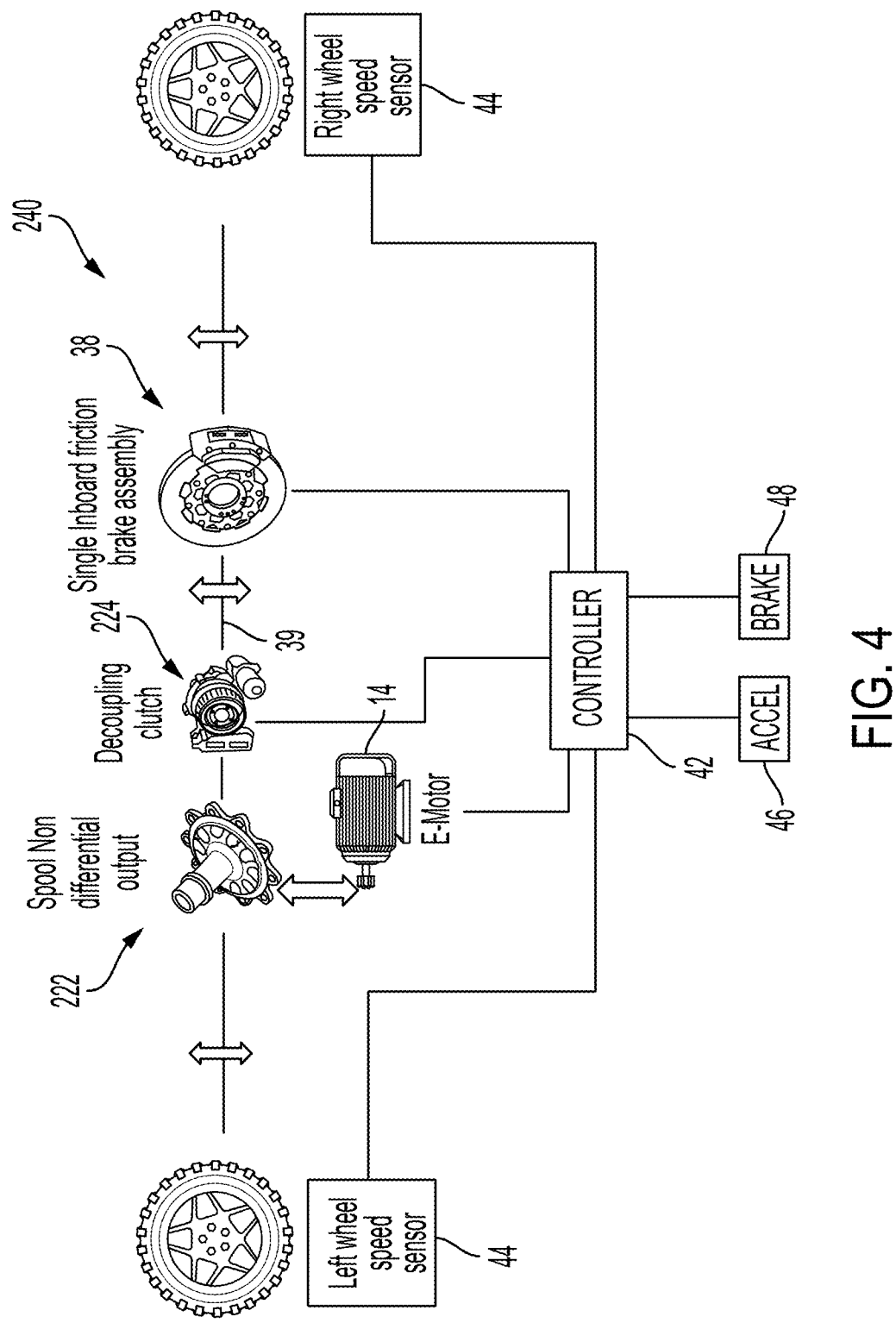
FIG. 4 is a schematic diagram of an yet another example braking system in accordance with the principles of the present application.

With reference now to FIG. 4, an alternative vehicle braking system 240 is illustrated. The vehicle braking system 240 is similar to the vehicle braking system 40, except the open differential 22 is replaced by a non-differential spool 222 and a decoupling clutch 224. In the example embodiment, the non-differential spool 222 is a limited slip or decoupling style clutch acting on one wheel output, without a geared differential. The combination of spool 222 replacing the differential along with the decoupling clutch 224 for the brake side output may be utilized to decouple (partially or fully open to allow a speed difference) when a hard stop is required where anti-lock braking performance is required. The spool 222 may function as a permanently locked differential and opening the decoupling clutch 224 under hard braking conditions can reduce stopping distances and keep the vehicle steering response functional under this condition.

Described herein are systems and methods for an electric vehicle with a single electric traction motor and a single inboard friction brake rather than friction brakes located at each wheel. The system utilizes an open differential, a limited slip differential, or a clutch without a geared differential. During a braking action, the vehicle initially utilizes the regenerative braking capability of the electric motor and blends in use of the inboard friction brake to stop and hold the vehicle. When the requested braking exceeds the regenerative braking capacity, the inboard friction brake is utilized until the regenerative braking capability can handle the remaining braking power. In this way, the system advantageously reduces components and cost compared to conventional dual in-wheel braking systems.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric vehicle, comprising:
an electric traction motor configured to drive the vehicle;
first and second half shafts operably coupled to the electric traction motor;
a single inboard friction brake assembly operably coupled to the first half shaft and configured to selectively brake the first half shaft and a first wheel connected thereto; and
a controller in signal communication with the electric traction motor and the inboard friction brake assembly to selectively perform a regenerative braking operation with the electric traction motor and a friction braking operation with the inboard friction brake assembly,
wherein the first half shaft is coupled to a first wheel, and the second half shaft is coupled to a second wheel, and further comprising a wheel speed sensor operably coupled to each of the first and second wheels and in signal communication with the controller, wherein the controller is configured to utilize the regenerative braking operation to slow the electric vehicle during a braking operation, and subsequently blend in use of the inboard friction brake assembly to stop and hold the electric vehicle still.

2. The electric vehicle of claim 1, further comprising a regenerative braking system in signal communication with the controller and configured to perform the regenerative braking operation.

3. The electric vehicle of claim 1, further comprising a gearbox assembly coupled to the electric traction motor.

4. The electric vehicle of claim 1, further comprising an open differential coupled between the first and second half shafts and operably coupled to the electric traction motor.

5. The electric vehicle of claim 1, further comprising a limited slip differential coupled between the first and second half shafts and operably coupled to the electric traction motor.

6. The electric vehicle of claim 1, further comprising a limited slip clutch coupled between the first and second half shafts and operably coupled to the electric traction motor.

7. The electric vehicle of claim 1, further comprising:

a non-differential spool coupled to the electric traction motor; and a decoupling clutch coupled between the first and second half shafts and operably coupled to the electric traction motor.

8. The electric vehicle of claim 7, wherein the decoupling clutch is configured to interrupt torque through an intermediate shaft between the spool and the inboard friction brake assembly.

9. The electric vehicle of claim 1, wherein the first and second half shafts provide power to vehicle wheels without a differential.

10. The electric vehicle of claim 1, wherein the electric vehicle only includes a single electric traction motor.

11. The electric vehicle of claim 1, wherein the inboard friction brake assembly provides the only friction braking of the electric vehicle.

12. An electric vehicle, comprising:

an electric traction motor configured to drive the vehicle;

first and second half shafts operably coupled to the electric traction motor;

a single inboard friction brake assembly operably coupled to the first half shaft and configured to selectively brake the first half shaft and a first wheel connected thereto; and a controller in signal communication with the electric traction motor and the inboard friction brake assembly to selectively perform a regenerative braking operation with the electric traction motor and a friction braking operation with the inboard friction brake assembly, wherein the first half shaft is coupled to a first wheel, and the second half shaft is coupled to a second wheel, and further comprising a wheel speed sensor operably coupled to each of the first and second wheels and in signal communication with the controller, wherein when a hard braking is requested by a driver from a speed that exceeds the electric traction motor's ability to absorb and dissipate the kinetic energy of the electric vehicle via the regenerative braking operation, the controller is programmed to utilize the inboard friction brake assembly to dissipate the kinetic energy until a vehicle speed and rate of deceleration, as determined by the wheel speed sensors, are reduced to a point where the electric traction motor can manage the deceleration rate via the regenerative braking operation.

13. The electric vehicle of claim 12, further comprising a regenerative braking system in signal communication with the controller and configured to perform the regenerative braking operation.

14. The electric vehicle of claim 12, further comprising a gearbox assembly coupled to the electric traction motor.

15. The electric vehicle of claim 12, further comprising an open differential coupled between the first and second half shafts and operably coupled to the electric traction motor.

16. The electric vehicle of claim 12, further comprising a limited slip differential coupled between the first and second half shafts and operably coupled to the electric traction motor.

17. The electric vehicle of claim 12, further comprising a limited slip clutch coupled between the first and second half shafts and operably coupled to the electric traction motor.

18. The electric vehicle of claim 12, further comprising:

a non-differential spool coupled to the electric traction motor; and a decoupling clutch coupled between the first and second half shafts and operably coupled to the electric traction motor, wherein the decoupling clutch is configured to interrupt torque through an intermediate shaft between the spool and the inboard friction brake assembly.

19. The electric vehicle of claim 12, wherein the first and second half shafts provide power to vehicle wheels without a differential.

* * * * *